(12) United States Patent
Prawiharjo et al.

(10) Patent No.: US 8,824,041 B2
(45) Date of Patent: Sep. 2, 2014

(54) RECONFIGURABLE REPETITION RATE AND ENERGY CHIRPED PULSE AMPLIFICATION FIBER LASER

(75) Inventors: Jerry Prawiharjo, Sunnyvale, CA (US); Sha Tong, Mountain View, CA (US); Lawrence West, San Jose, CA (US); Jinglun Zhao, Sunnyvale, CA (US); Anthony Hong Lin, Palo Alto, CA (US)

(73) Assignee: Calmar Optcom, Inc., Palo Alto, CA (US)

( * ) Notice: Subject to any disclaimer, the term of this patent is extended or adjusted under 35 U.S.C. 154(b) by 433 days.

(21) Appl. No.: 13/420,485

(22) Filed: Mar. 14, 2012

(65) Prior Publication Data

US 2013/0034115 A1    Feb. 7, 2013

Related U.S. Application Data

(60) Provisional application No. 61/574,489, filed on Aug. 3, 2011.

(51) Int. Cl.
*H01S 3/07* (2006.01)
*H01S 3/13* (2006.01)

(52) U.S. Cl.
USPC ............... 359/333; 359/337.4; 359/337.5

(58) Field of Classification Search
USPC .................. 359/333, 337.4, 337.5
See application file for complete search history.

(56) References Cited

U.S. PATENT DOCUMENTS

| | | | |
|---|---|---|---|
| 8,125,704 B2* | 2/2012 | Mielke et al. | 359/341.1 |
| 8,730,568 B2* | 5/2014 | Tong et al. | 359/333 |
| 2010/0118900 A1* | 5/2010 | Waarts et al. | 372/25 |
| 2012/0062984 A1* | 3/2012 | Tong et al. | 359/337.2 |
| 2013/0293941 A1* | 11/2013 | Harter et al. | 359/238 |

* cited by examiner

*Primary Examiner* — Mark Hellner
(74) *Attorney, Agent, or Firm* — SV Patent Service

(57) ABSTRACT

The present application discloses a novel chirped pulse amplification (CPA) fiber laser that has easily reconfigured output repetition rate and energy, and high spatial and temporal quality.

22 Claims, 7 Drawing Sheets

RECONFIGURABLE REPETITION RATE AND ENERGY CHIRPED PULSE AMPLIFICATION FIBER LASER

PRIORITY CLAIM AND RELATED PATENT APPLICATION

This patent document claims priority to U.S. Provisional Application No. 61/574,489 entitled "Reconfigurable repetition rate and energy chirped pulse amplification fiber laser" and filed Aug. 3, 2011 by the same inventors, the disclosures of which is incorporated by reference as part of the disclosure of this document.

BACKGROUND OF THE INVENTION

The present application relates to amplification and control of laser pulses in fiber laser devices.

Chirped pulse amplification (CPA) fiber lasers are a type of compact and economical laser device that can generate microjoule-level sub-picosecond laser pulses. Unlike traditional pulse laser systems, CPA fiber lasers do not need high-voltages and bulky water-cooling system. CPA fiber lasers are robust and simple to use, and can be implemented in turn-key designs that provide femtosecond pulses straight out-of-the box. Laser pulses produced by CPA fiber lasers can produce a thermal ablation in most materials, which makes it ideal for micro-machining and precision surgeries.

Pulsed laser devices have been used in eye surgical applications, with different types of eye surgeries having different requirements on the laser pulses. Corneal surgery (used in LASIK) and corneal transplant require low energy (~1-5 µJ) and high repetition rate (200 KHz-1 MHz) laser pulses for smooth and fast cuts. Lens fragmentation in cataract surgery, on the other hand, requires higher energy laser pulses (>15 µJ) in loosely focused beams to achieve deeper cuts. Since laser device contributes to the majority of the cost in a laser surgery system, there is a long-felt economic need for a CPA fiber laser that can be used in both LASIK and cataract surgery applications.

The effectiveness of laser-pulse ablation depends on the peak power and the repetition rate of the laser pulses. The peak power in a femtosecond laser pulse provides the energy intensity necessary to ionize the target material, thereby generating plasma which ablates the target material. The repetition rate of the laser pulses determines the speed of the ablation. The repetition rate also determines the energy per pulse because the average power of a CPA fiber laser is limited by a maximum system capability and a safety limit for the ablation target (e.g. the eye).

Thus, for a given average power, peak pulse power and repetition rate trade off each other in a CPA fiber laser device: a lower repetition rate is accompanied by a higher energy per pulse, and vice-versa. As a result, conventional CPA fiber lasers generate either high-repetition-rate low-energy (HRLE) or low-repetition-rate high-energy (LRHE) pulses; but they cannot achieve high repetition rate and high peak pulse power simultaneously.

The peak power in ultra short (picoseconds or shorter) laser pulses usually does not linearly scale with the pulse energy per laser pulse in a fiber laser device. This non-linearity is a result of nonlinear interactions between the electric field and the dielectric glass medium in the tight confinement and long interaction length in optical fibers. In fiber-based CPA lasers, the impact of the nonlinear interaction is minimized by temporal and spatial stretching. In temporal stretching, the ultra short laser pulses are stretched prior to amplification, and recompressed after amplification to regain high peak power in the ultra short laser pulses. On the other hand, spatial stretching employs a large mode area (LMA) fiber in order to reduce the optical energy intensity in the fiber.

Unfortunately, limitations exist to both temporal and spatial stretching: temporal stretching is limited by the size of the compressor; the spatial stretching is limited by the existence of higher-order-modes in the LMA fiber. These limitations degrade temporal and spatial qualities of the laser pulses, resulting in incomplete removal of nonlinear interactions at the required high pulse energies. Self-phase-modulation (SPM), the lowest-order of nonlinear interaction, can be observed at the pulse energy level of tens of µJ. As the peak pulse power is increased, nonlinear phase due to the SPM is accumulated in a laser pulse. The nonlinear phase, which is quantified by the B-integral, needs to be compensated in order to achieve laser pulses of the shortest possible duration and highest possible peak power.

There is therefore a need for fiber laser devices that can output laser pulses with repetition rate and energy as required by above described applications, while maintaining spatial and temporal quality.

SUMMARY OF THE INVENTION

This present application relates to a novel chirped pulse amplification fiber laser device having reconfigurable output repetition rate and energy, as well as high spatial and temporal quality. Nonlinear dispersions can be minimized or eliminated at different pulse repetition rates and pulse energies.

In one general aspect, the present invention relates to a chirped pulse amplification (CPA) fiber laser device that includes a seed laser that can produce input laser pulses at an initial repetition rate; a pulse stretcher that can stretch the input laser pulses to produce stretched laser pulses; a pulse picker that can modulate the stretched laser pulses to a modulated repetition rate in response to a repetition control signal; a pulse rate controller that can produce the repetition control signal to control the pulse picker to modulate the stretched laser pulses; an optical power amplifier that can amplify the stretched laser pulses to produce first amplified laser pulses; a pulse compressor that can compress durations of the first amplified laser pulses to produce output laser pulses at the modulated repetition rate; a switchable dispersion; and a pulse linearity controller that can control the switchable dispersion compensator to compensate for non-linear dispersion in the output laser pulses in accordance to the modulated repetition rate.

Implementations of the system may include one or more of the following. The switchable dispersion compensator can include a plurality of optical fiber paths in a parallel circuit, wherein each of the plurality of optical fiber paths can produce an optical dispersion to compensate for a nonlinear optical dispersion in the output laser pulses at the specific modulated repetition rate; and an optical switch that can direct the stretched laser pulses to pass through one of the plurality of optical fiber paths under the control of the pulse linearity controller. The switchable dispersion compensator can be coupled between the pulse stretcher and the pulse picker. The pulse stretcher can stretch the input laser pulses to produce the stretched laser pulses under the control of the pulse linearity controller to compensate for non-linear dispersions in the output laser pulses. The pulse stretcher can include a chirped fiber Bragg grating that can stretch the input laser pulses to produce the stretched laser pulses; and a temperature controller that can control the temperature of the chirped fiber Bragg grating in response to the pulse linearity controller based on the modulated repetition rate. The pulse linearity controller can control a first bias current in the optical power amplifier to vary pulse energies in the first amplified laser pulses in accordance to the modulated repetition rate. The fiber laser device can further include a first pre-amplifier coupled between the seed laser and the pulse stretcher, wherein the first pre-amplifier can amplify the input laser pulses to produce second amplified laser pulses, wherein the pulse stretcher can stretch the second amplified laser pulses to produce the stretched laser pulses. The first pre-amplifier can be controlled by the pulse linearity controller to vary widths of the second amplified laser pulses according to pulse energy levels. The pulse linearity controller can control the first pre-amplifier to vary widths of the second amplified laser pulses according to the modulated repetition rate. The pulse linearity controller can control a second bias current in the first pre-amplifier to vary energies in the second amplified laser pulses in accordance to the modulated repetition rate. The first pre-amplifier can produce substantially parabolic spectral and temporal pulse profiles in the second amplified laser pulses. The fiber laser device can further include a second pre-amplifier that can amplify the second amplified laser pulses to produce third amplified laser pulses, wherein the pulse picker can modulate repetition rate of the third amplified laser pulses. The pulse linearity controller can control a third bias current in the second pre-amplifier to vary energies in the third amplified laser pulses in accordance to the modulated repetition rate. The pulse compressor can be adjusted under the control of the pulse linearity controller to compensate for nonlinear dispersion in the output laser pulses in accordance to the modulated repetition rate. The pulse compressor can include a first grating and a second grating, wherein the separation distance between the first grating and the second grating is controlled by the pulse linearity controller. The pulse picker can include an acoustic-optics modulator or an electro-optical modulator.

In another aspect, the present invention relates to a chirped pulse amplification (CPA) fiber laser device that includes a seed laser that can produce input laser pulses at an initial repetition rate; a pulse stretcher that can stretch the input laser pulses to produce stretched laser pulses; a pulse picker that can modulate the stretched laser pulses to a modulated repetition rate in response to a repetition control signal; a pulse rate controller that can produce the repetition control signal to control the pulse picker to modulate the stretched laser pulses; an optical power amplifier that can amplify the stretched laser pulses to produce first amplified laser pulses; a pulse linearity controller that can control a first bias current in the optical power amplifier to vary pulse energies in the first amplified laser pulses in accordance to the modulated repetition rate; and a pulse compressor that can compress widths of the first amplified laser pulses to produce output laser pulses at the modulated repetition rate.

Implementations of the system may include one or more of the following. The first pre-amplifier can be controlled by the pulse linearity controller to vary widths of the second amplified laser pulses to minimize non-linear dispersions according to pulse energy levels. The pulse linearity controller can control the first pre-amplifier to vary widths of the second amplified laser pulses according to the modulated repetition rate. The fiber laser device can further include a switchable dispersion compensator, wherein the pulse linearity controller can control the switchable dispersion compensator to compensate for non-linear dispersion in the output laser pulses in accordance to the modulated repetition rate. The switchable dispersion compensator can include a plurality of optical fiber paths in a parallel circuit, wherein each of the plurality of optical fiber paths can produce an optical dispersion to compensate for a nonlinear optical dispersion in the output laser pulses at the specific modulated repetition rate; and an optical switch can direct the stretched laser pulses to pass through one of the plurality of optical fiber paths under the control of the pulse linearity controller. The pulse compressor can be adjusted under the control of the pulse linearity controller to compensate for nonlinear dispersion in the output laser pulses in accordance to the modulated repetition rate.

These and other aspects, their implementations and other features are described in detail in the drawings, the description and the claims.

DETAILED DESCRIPTION OF THE INVENTION

Figure 1:
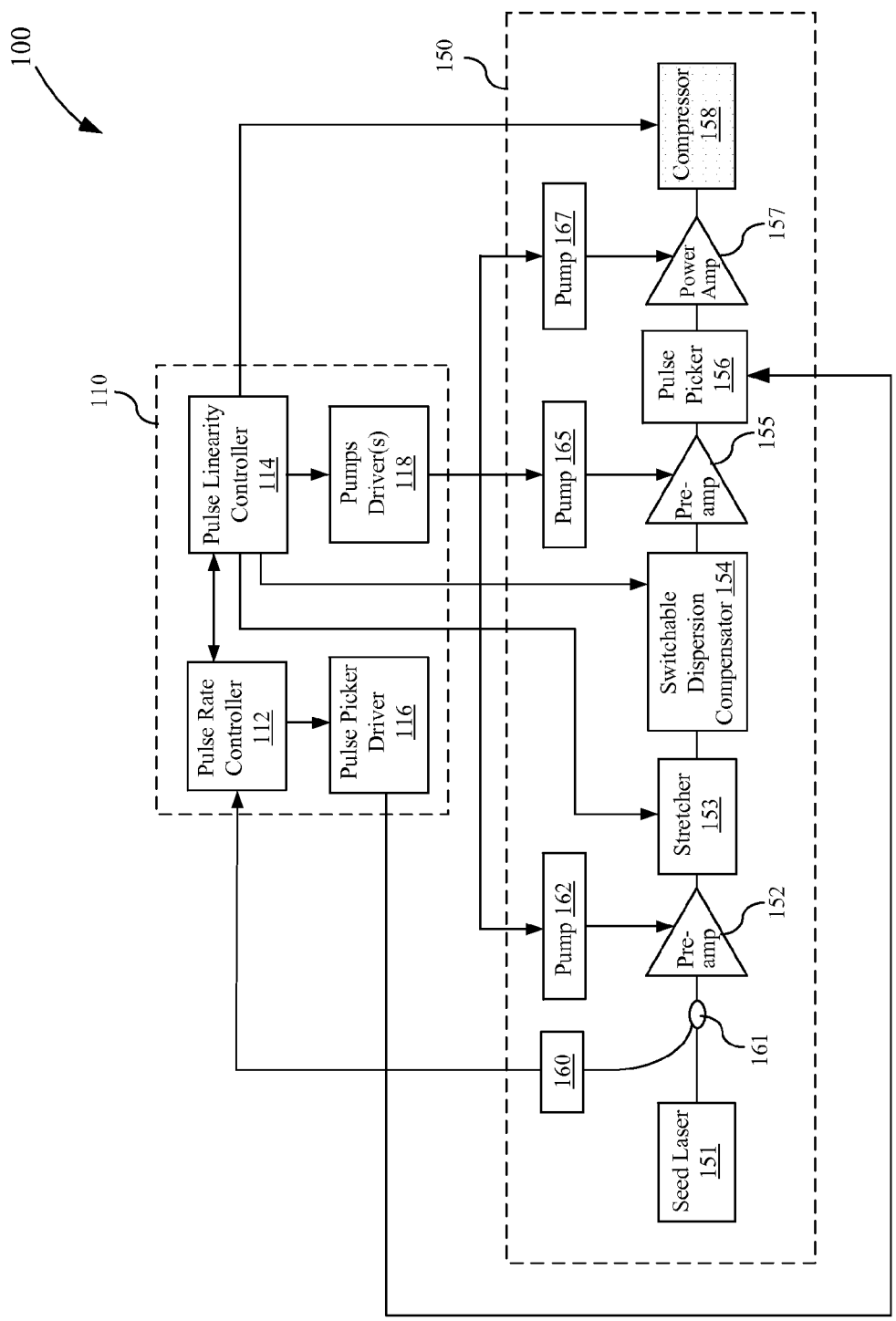
FIG. 1 is a block diagram of a CPA fiber laser device in accordance with the present invention.

Referring to FIG. 1, a chirped pulse amplification fiber laser device 100 includes a controller unit 110 including components for electronics and controls, and a head unit 150 including optical components. The controller unit 110 includes a pulse rate controller 112, a pulse linearity controller 114, a pulse picker driver 116, and one or more pump drivers 118.

The head unit 150 includes a seed pulsed laser 151 that generates a series of input laser pulses having seed pulse width and repeat at an initial repetition rate. An optional preamplifier 152 is configured to amplify and shape the optical spectrum of the input laser pulses. A pulse stretcher 153 receives the input laser pulses from the seed laser 151 or the pre-amplifier 152, and stretches the input laser pulses to produce stretched laser pulses having pulse width greater than the seed pulses. An optional switchable dispersion compensator 154 can produce an optical dispersion in the stretched laser pulses under the control of the pulse linearity controller. The optical dispersion produced can compensate for the non-linear optical dispersion in the stretched laser pulses specific to modulated repetition rate (selected by the pulse picker 156 described below). Another optional preamplifier 155 is configured to amplify the stretched laser pulses and can further shape the optical spectrum of the stretched laser pulses. A pulse picker 156 is configured to pick some pulses from a train of stretched laser pulses therefore reducing the initial repetition rate to a modulated repetition rate. A main optical power amplifier 157 amplifies the stretched laser pulses after pulse picking by the pulse picker 156 to produce amplified laser pulses, which are directed to a pulse compressor 158. The optical power amplifier 157 can include one or more fiber amplifiers. The pulse compressor 158 compresses the pulse width of the amplified laser pulses to output shortened laser pulses at the modulated repetition rate. In some embodiments, as described below, the pulse compressor 158 can be controlled by the pulse linearity controller 114 to maximize peak power of the output laser pulses.

The initial repetition rate of the stretched laser pulses can be reduced by the pulse picker 156 coupled to the input of the fiber based optical power amplifier 157. With some stretch laser pulses removed, the energy of the laser light is concentrated in remaining fewer laser pulses with higher energy for each laser pulse. The pulse picker 156 can be implemented as an acousto-optics modulator (AOM). The pulse picker driver 116 creates RF electrical power to create acoustic waves in the pulse picker 156 to pick pulses to produce a train of stretched laser pulses at the modulated repetition rate. In some embodiments, the pulse picker 156 can also be implemented by an Electro-Optical Modulator (EOM) that rotates the beam polarization with a high electric field. This approach requires higher voltages that are difficult to be switched fast. Moreover, it is also difficult to remove undesired satellite pulses, which divert energy from the output laser pulses.

The pulse picker driver 116 is in turn controlled by a pulse rate control signal produced by the pulse rate controller 112. The pulse rate controller 112 is programmed to provide a variety of modulated repetition rates. The width and delay of the modulation is programmed to allow switching between different modulated repetition rates without affecting the quality of the pulse train. The pulse rate controller 112 can be implemented by a field-programmable gate array (FPGA) or other integrated circuits. In one implementation, the pulse rate controller 112 can receive a digital signal having repetition rate that is synchronous with the input laser pulses from the seed laser 151. The digital signal can be generated by an optical tap 161 on the output from the seed laser 151, and then converted to electrical signal by a photo detector and subsequently amplified by a detection amplification circuit 160. This detector amplifier circuit 160 is required to have sufficient speed to resolve the individual input laser pulses at the repetition rate of the seed laser 151. The digital electrical pulses produced is synchronous with the laser output. The pulse rate controller 112 can reduce and pick the pulse rate desired by simple digital counter and divider circuits. The output pulse width and delay can also need to be adjusted by program, external switches, or other means to properly select the optical pulses with the pulse picker 156.

The preamplifier 152, the preamplifier 155, and the optical power amplifier 157 are respectively pumped by pumps 162, 165, and 167 which are driven by the one or more pump driver(s) 118 in the controller unit 110. The pumps 162, 165, and 167 can be implemented by low cost semi-conductor diodes or lasers. The preamplifier 152, the preamplifier 155, and the optical power amplifier 157 can be implemented by doped optical fibers, which makes the CPA fiber laser device 100 compact, robust, and of low cost. However, as pointed out above, laser light which is confined to a small area and propagates over a long section of optical fiber tend to experience nonlinear interactions between electric field and fiber glass medium, which causes unwanted non-linear pulse distortions.

In accordance to the present invention, the fiber-based preamplifier 152, the preamplifier 155, and the optical power amplifier 157 are optimized by different pump currents at different modulated repetition rates. Whenever the modulated repetition rate is changed by the pulse rate controller 112, the pulse linearity controller 114 is updated. The pulse linearity controller 114 automatically controls the pump driver(s) 118 to adjust the pump currents in the pumps 162, 165, and 167 according to the new modulated repetition rate. In one implementation, all pump diode currents are first turned off. The pump currents for the different fiber-based amplifiers are then selectively turned in sequence to new pump current settings to enable the newly set modulated repetition rate and pulse energy. This approach can avoid undesired transient effects when pulse rates are changed.

The amplified laser pulses tend to have high laser peak power which can reach sufficiently high levels that cause undesired optical nonlinear effects in fiber and can cause damage to the fiber. Such nonlinear optical properties in optical fiber can be characterized by B integral:

$$B = \frac{2\pi}{\lambda} \int n_2 j(z) dz \qquad \text{eqn. (1)}$$

where l(z) is the optical intensity at position z along the propagation direction of the beam, and $n_2$ the second-order nonlinear refractive index caused by the Kerr effect. The B integral represents the total on-axis nonlinear phase shift that laser light accumulated through the optical components in a fiber laser device.

Figure 2:
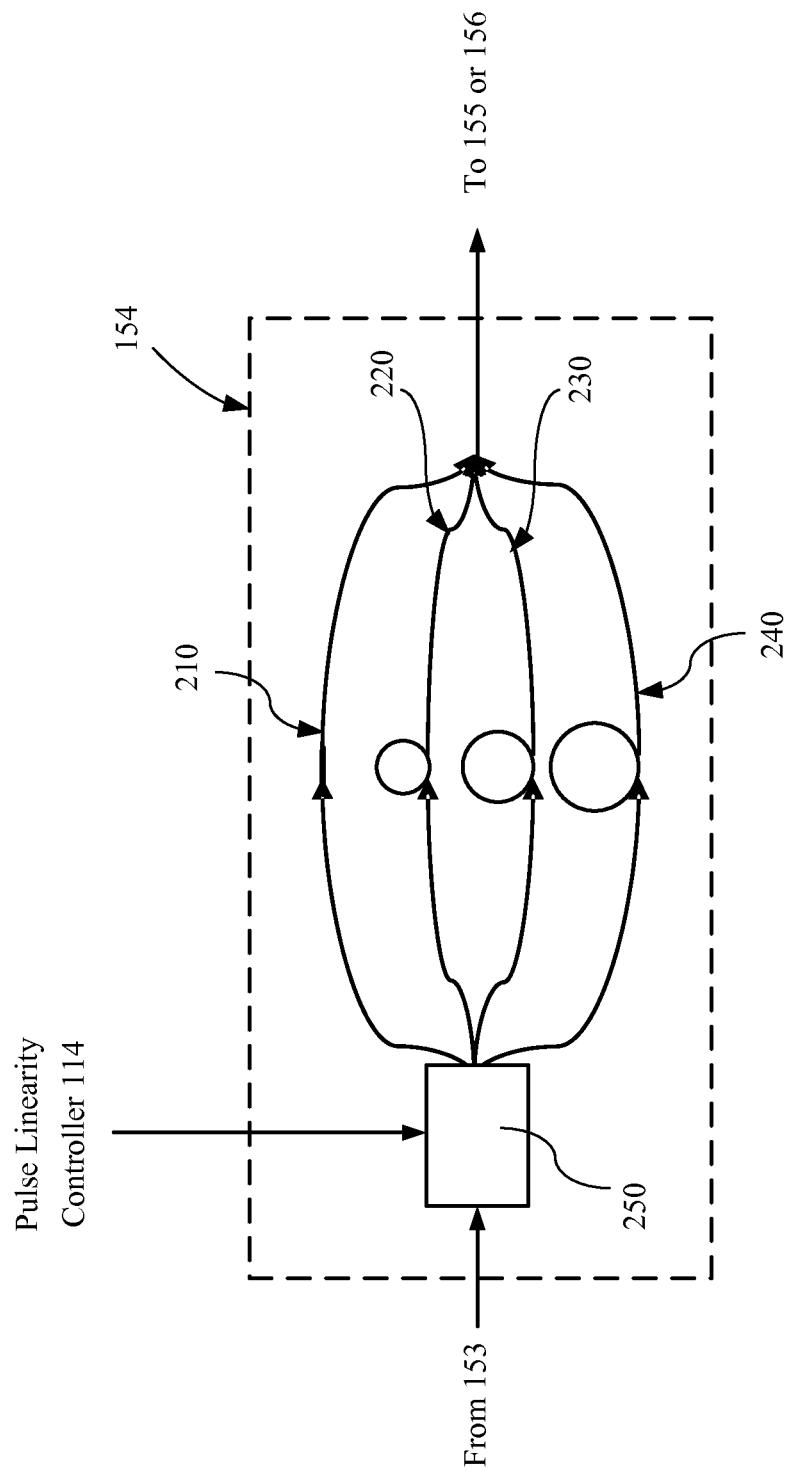
FIG. 2 is a schematic block diagram for an exemplified switchable dispersion compensator suitable for the CPA fiber laser device shown in FIG. 1.

In some embodiments, referring to FIG. 2, the switchable dispersion compensator 154 includes an optical switch 250 and multiple parallel optical fiber paths 210, 220, 230, and 240, each having a different fiber length. The fiber lengths of the optical fiber paths 210, 220, 230, and 240 are tailored to provide optical dispersions required to compensate for nonlinear optical dispersions characterized by different B-integral values at different modulated repetition rates. A bigger B-integration value is matched by a shorter optical fiber path and thus smaller optical dispersion. The switchable dispersion compensator 154 receives the stretched laser pulses from the pulse stretcher 153. The optical switch 250 can direct the stretched laser pulses to one of the optical fiber paths 210, 220, 230, and 240 under the control of the pulse linearity controller 114 according to the current modulated repetition rate. The optical switch 250 can be implemented by a micro-mechanical or solid-state switch. The stretched laser pulses exiting the one of the optical fiber paths 210, 220, 230, and 240 carries an optical dispersion specifically compensating for the nonlinear optical dispersion characterized by the B-integral value at that modulated repetition rate. The stretched laser pulses are sent to the optional pre-amplifier 155 or the pulse picker 156.

It should be noted that the switchable dispersion compensator 154 can be positioned at other locations of the optical path between the seed laser 151 and the output laser light. For example, the switchable dispersion compensator 154 can be positioned between the preamplifier 155 and the pulse picker 156.

Figure 3:
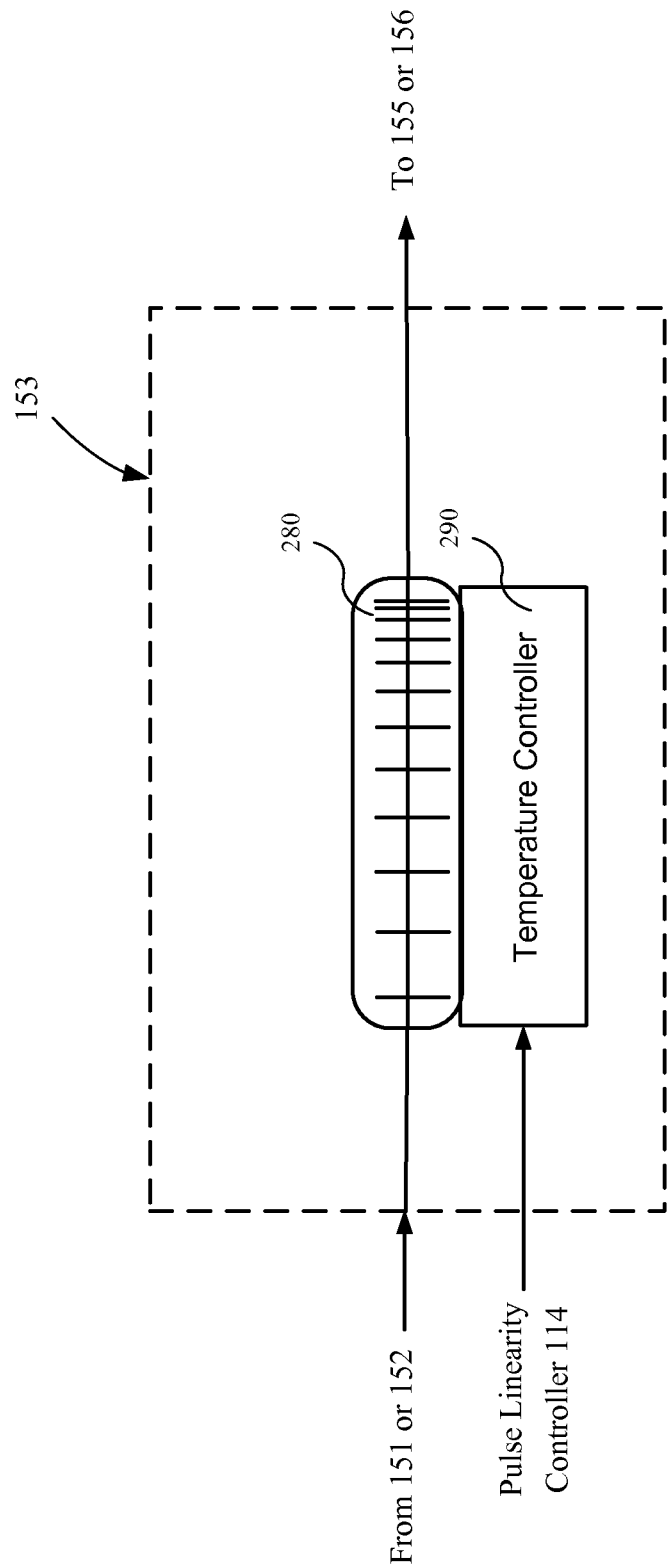
FIG. 3 is a schematic block diagram for an exemplified pulse stretcher that is temperature controlled to compensate for non-linear dispersions.

In some embodiments, referring to FIG. 3, The CPA fiber laser device 100 includes several design features to minimize the B-integral value in the system. The pulse stretcher 153 can be implemented by a carefully designed chirped fiber Bragg grating (CFBG) 280 to temporally stretch the pulse. Moreover, the temperature of the CFBG can be controlled by a temperature controller 290, which is further controlled by the pulse linearity controller 114. Since the degree of pulse stretching is affected by the temperature of the CFBG 280, the widths of stretched pulses can be adjusted by the pulse linearity controller 114 in accordance to the modulated repetition rate to compensate for non-linear dispersions in the laser pulses.

In some embodiments, highly-doped double-clad Large-mode-area (LMA) fibers are used to form the fiber-based preamplifier 152, the preamplifier 155, and the optical power amplifier 157, which reduces laser intensity and interaction length within the LMA fibers. The effective area of the double-clad LMA fibers can be orders of magnitude larger than single-mode-fibers (SMFs). The minimization of the B-integral, with results shown below, allows the CPA fiber laser device 100 to produce quality low-repetition-rate-high-energy (LRHE) pulses.

Figure 4:
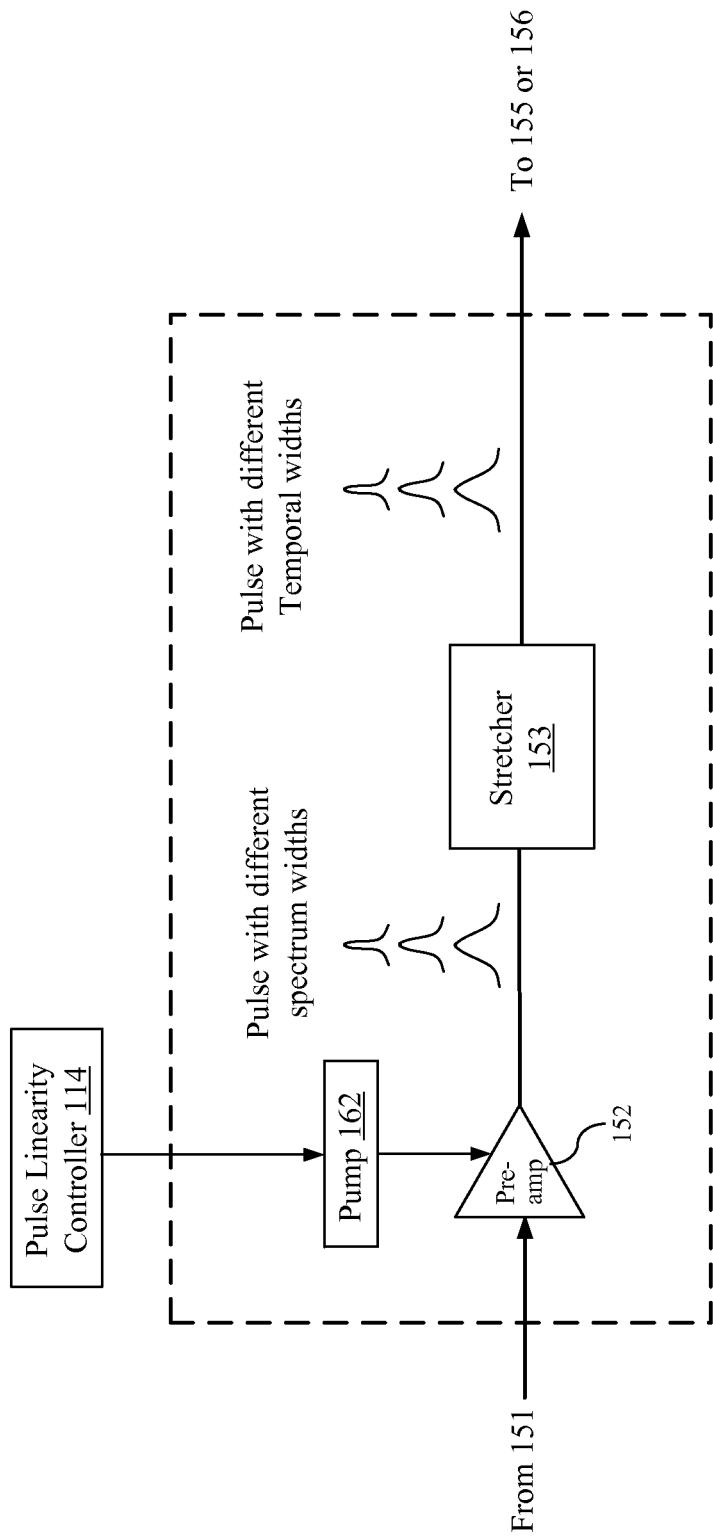
FIG. 4 is a schematic block diagram for a parabolic pre-amplifier that is configured to adjust spectral and temporal pulse profiles to compensate for non-linear dispersions.

In some embodiments, referring to FIG. 4, linear dispersion compensation techniques are employed to preserve the spatial quality, the output position, and the pointing of the laser. The preamplifiers 152 and/or 155 are configured to shape the optical spectrum and the temporal profile of the input laser pulses to substantially parabolic shapes. As a result, the SPM induced intensity dependent phase is temporal quadratic, indicating the pulse is linearly chirped across the temporal profile. The accumulated nonlinear phase in a stretched laser pulse translates into a linear dispersion out of the parabolic pre-amplifiers 152 and/or 155. The linear dispersion assures uniform and high pulse quality at different laser energy levels, allowing peak power to substantially linearly increase with pulse energy.

In some embodiments, still referring to FIG. 4, the bias current of the parabolic preamplifier 152 is controlled by the pulse linearity controller 114 via the current pump 162 to produce different pulse widths based on the modulated repetition rate. The temporal and spectral widths of the stretched pulses can be adjusted to compensate for non-linear dispersions in the laser pulses in accordance to the modulated repetition rate. For example, by stretch less for low energy pulse and stretch more for high energy pulse, we can ensure pulses at different energy levels to experience the same B integral. In this implementation, the functions of the switchable dispersion compensator 154 can be performed by the dynamically controlled parabolic pre-amplifier 152, which can remove the need for the switchable dispersion compensator 154 as described above.

Figure 5:
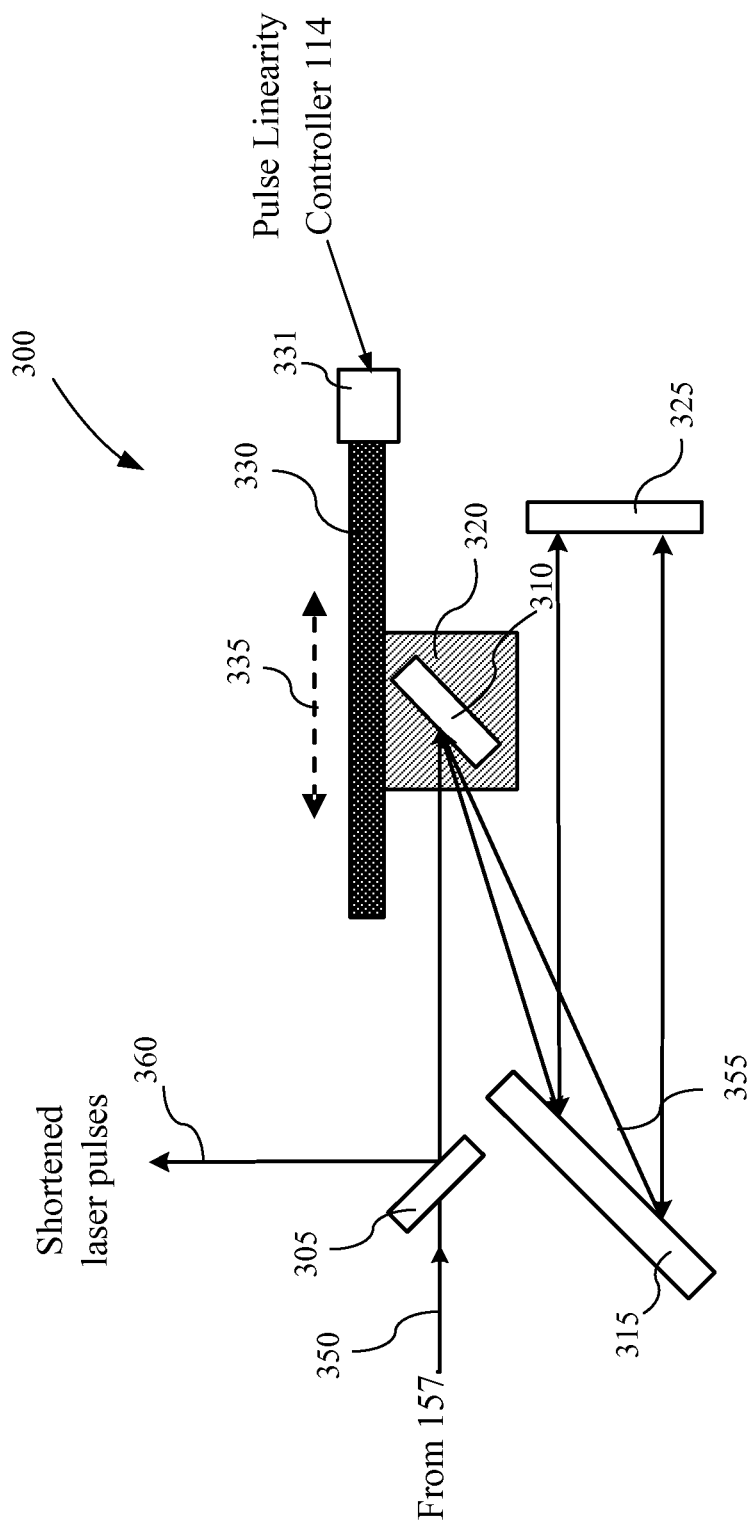
FIG. 5 illustrates an exemplified pulse compressor suitable for the CPA fiber laser device shown in FIG. 1.

The pulse compressor 158 can be implemented by a gratings-pair compressor 300, as shown in FIG. 5. The gratings-pair compressor 300 includes a grating 310 mounted on a translational stage 320 and a grating 315 that is fixed. The amplified stretched laser pulses from the optical power amplifier 157 (FIG. 1) form a laser light 350 passes through a beam splitter 305 and impinges on the movable grating 310 first. The diffracted laser light 355 is diffracted again by the fixed grating 315. The diffracted laser light is reflected by a mirror 325 to return in the same optical path and reflected by the beam splitter 305 to form an output laser light 360 comprising shortened laser pulses. The separation between the grating 310 and grating 315 can be varied by a translation mechanism 330 that can move the translational stage 330 and the grating 315 in direction 335. The translation mechanism 330 can be driven by a motor 331 under the control of the pulse linearity controller 114 or by a manual adjustment. The separation between the grating 310 and grating 315 determines the amount of linear dispersion on the amplified stretched laser pulses. In response to a modulated repetition rate set by the pulse rate controller 112 (FIG. 1), the pulse linearity controller 114 adjusts the separation between the grating 310 and grating 315 to adjust the linear dispersion to close to zero to obtain the optimal pulse shape. As a result, the peak pulse power is maximized in the shortened laser pulses at the modulated repetition rate in the output laser light 360.

Figure 6:
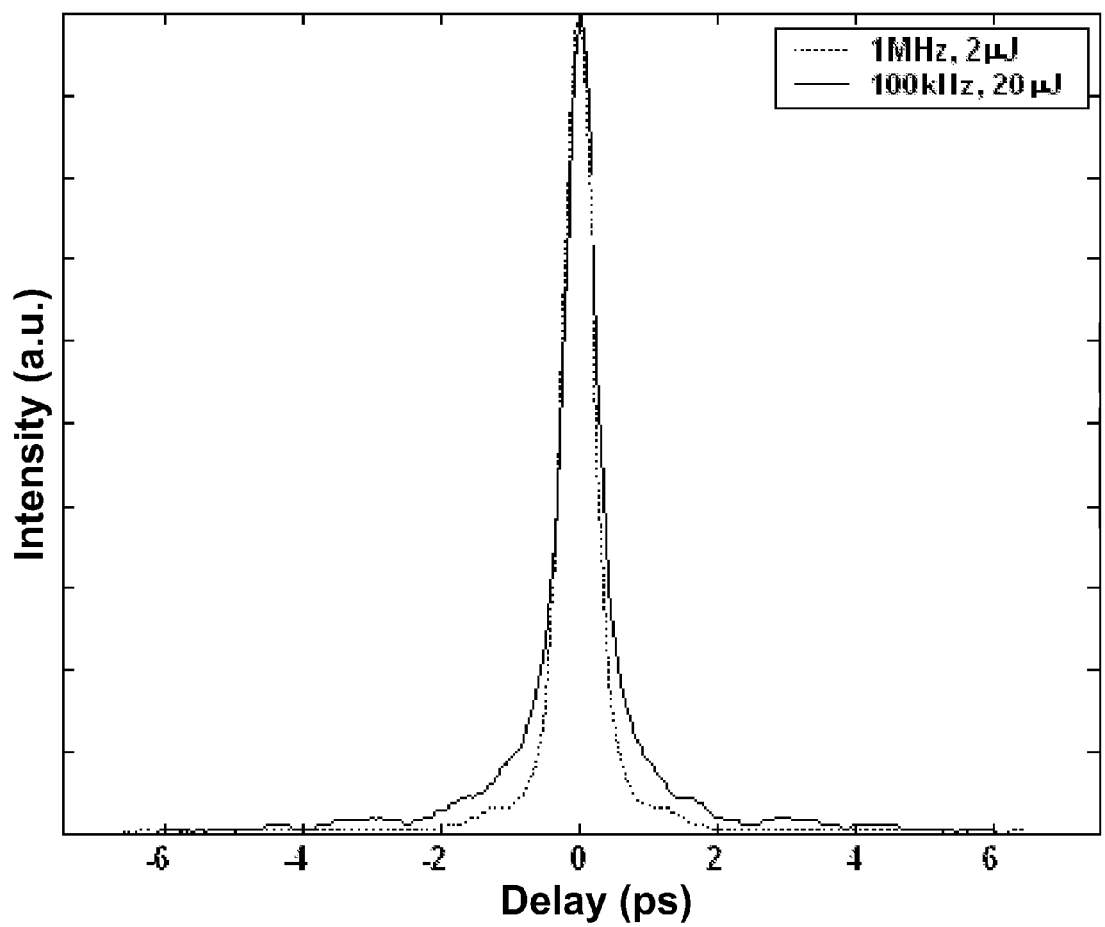
FIG. 6 shows autocorrelation traces measured from low-repetition-rate-high-energy and high-repetition-rate-low-energy laser pulses produced by a CPA fiber laser device in accordance with the present invention.
Figure 7:
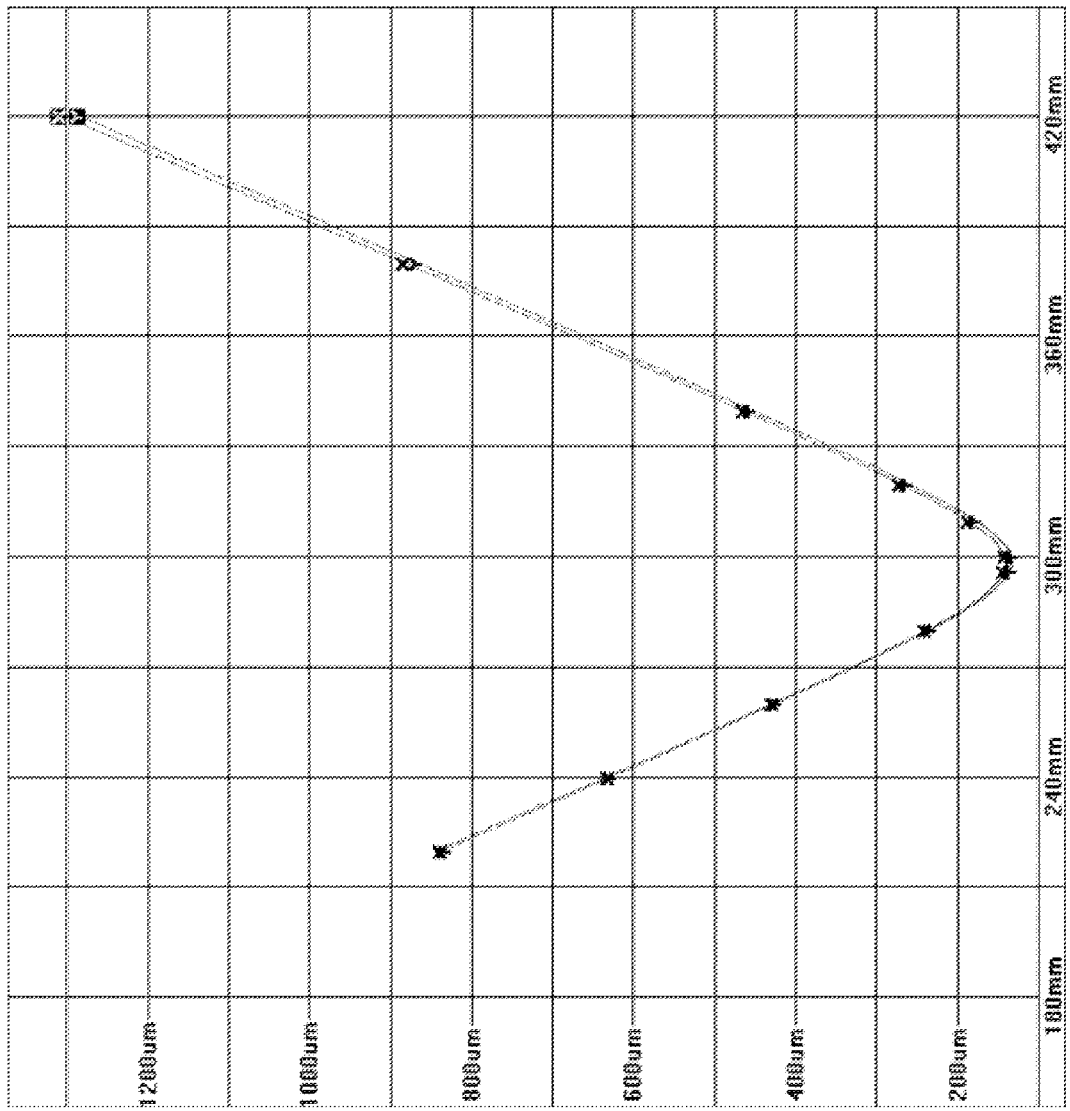
FIG. 7 is a plot of beam qualities measured from low-repetition-rate-high-energy and high-repetition-rate-low-energy laser pulses produced by a CPA fiber laser device in accordance with the present invention.

The performance of the disclosed CPA fiber laser device is shown in FIGS. 6 and 7, and Table 1 below. FIG. 6 shows the autocorrelation traces of low-repetition-rate-high-energy (LRHE) and high-repetition-rate-low-energy (HRLE) laser pulses produced by the CPA fiber laser device 100. The HRLE laser pulses have a 1 MHz repetition rate and 2 µJ pulse energy. The LRHE laser pulses have a 100 KHz repetition rate and 20 µJ pulse energy. The LRHE and the HRLE laser pulses are shown to have similar pulse widths with negligible difference in their overall shapes. The beam qualities, as shown in FIG. 7 and in Table 1 below, do not show significant differences between the LRHE and the HRLE laser pulses. The pointing remains the same in all configurations. These high quality and consistent performances of the presently disclosed designs allow a single CPA fiber laser device to fulfill a wide range of applications with different requirements on repetition rates and pulse energies.

TABLE 1

Beam parameters for LRHE and HRLE laser pulses produced by the presently disclosed CPA fiber laser device

| Beam Qualities | $M^2_x$ | $M^2_y$ | Astigmatism | Asymmetry |
|---|---|---|---|---|
| 1 MHz, 2 µJ | 1.10 | 1.07 | 0.14 | 1.07 |
| 100 kHz, 20 µJ | 1.10 | 1.07 | 0.09 | 1.03 |

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made without deviating from the spirit of the present invention. For example, the values for the repetition rates, the pulse energies, and pulse powers given above only serve as illustration purposes. The disclosed CPA fiber laser device is compatible with other repetition rates, the pulse energies, and pulse powers. Moreover, the switchable dispersion compensator can include other configurations or topologies for creating different amounts of optical dispersions for compensating for B-integral values at different pulse repetition rates.

What is claimed is:
1. A chirped pulse amplification (CPA) fiber laser device, comprising:
 a seed laser configured to produce input laser pulses at an initial repetition rate;
 a pulse stretcher configured to stretch the input laser pulses to produce stretched laser pulses;

a pulse picker configured to modulate the stretched laser pulses to a modulated repetition rate in response to a repetition control signal;

a pulse rate controller configured to produce the repetition control signal to control the pulse picker to modulate the stretched laser pulses;

an optical power amplifier configured to amplify the stretched laser pulses to produce first amplified laser pulses;

a pulse compressor configured to compress durations of the first amplified laser pulses to produce output laser pulses at the modulated repetition rate;

a switchable dispersion compensator; and a pulse linearity controller configured to control the switchable dispersion compensator to compensate for nonlinear dispersion in the output laser pulses in accordance to the modulated repetition rate.

2. The fiber laser device of claim 1, wherein the switchable dispersion compensator comprises:

a plurality of optical fiber paths in a parallel circuit, wherein each of the plurality of optical fiber paths is configured to produce an optical dispersion to compensate for a nonlinear optical dispersion in the output laser pulses at the specific modulated repetition rate; and an optical switch configured to direct the stretched laser pulses to pass through one of the plurality of optical fiber paths under the control of the pulse linearity controller.

3. The fiber laser device of claim 1, wherein the switchable dispersion compensator is coupled between the pulse stretcher and the pulse picker.

4. The fiber laser device of claim 1, wherein the pulse stretcher is configured to stretch the input laser pulses to produce the stretched laser pulses under the control of the pulse linearity controller to compensate for non-linear dispersions in the output laser pulses.

5. The fiber laser device of claim 4, wherein the pulse stretcher comprises:

a chirped fiber Bragg grating configured to stretch the input laser pulses to produce the stretched laser pulses; and a temperature controller configured to control the temperature of the chirped fiber Bragg grating in response to the pulse linearity controller based on the modulated repetition rate.

6. The fiber laser device of claim 1, wherein the pulse linearity controller is configured to control a first bias current in the optical power amplifier to vary pulse energies in the first amplified laser pulses in accordance to the modulated repetition rate.

7. The fiber laser device of claim 1, further comprising:

a first pre-amplifier coupled between the seed laser and the pulse stretcher, wherein the first pre-amplifier is configured to amplify the input laser pulses to produce second amplified laser pulses, wherein the pulse stretcher is configured to stretch the second amplified laser pulses to produce the stretched laser pulses.

8. The fiber laser device of claim 7, wherein the first pre-amplifier is controlled by the pulse linearity controller to vary widths of the second amplified laser pulses according to pulse energy levels.

9. The fiber laser device of claim 7, wherein the pulse linearity controller controls the first pre-amplifier to vary widths of the second amplified laser pulses according to the modulated repetition rate.

10. The fiber laser device of claim 7, wherein the pulse linearity controller is configured to control a second bias current in the first pre-amplifier to vary energies in the second amplified laser pulses in accordance to the modulated repetition rate.

11. The fiber laser device of claim 7, wherein the first pre-amplifier is configured to produce substantially parabolic spectral and temporal pulse profiles in the second amplified laser pulses.

12. The fiber laser device of claim 7, further comprising:

a second pre-amplifier configured to amplify the second amplified laser pulses to produce third amplified laser pulses, wherein the pulse picker configured to modulate repetition rate of the third amplified laser pulses.

13. The fiber laser device of claim 12, wherein the pulse linearity controller is configured to control a third bias current in the second pre-amplifier to vary energies in the third amplified laser pulses in accordance to the modulated repetition rate.

14. The fiber laser device of claim 1, wherein the pulse compressor is adjusted under the control of the pulse linearity controller to compensate for nonlinear dispersion in the output laser pulses in accordance to the modulated repetition rate.

15. The fiber laser device of claim 14, wherein the pulse compressor comprises a first grating and a second grating, wherein the separation distance between the first grating and the second grating is controlled by the pulse linearity controller.

16. The fiber laser device of claim 1, wherein the pulse picker comprises an acoustic-optics modulator or an electro-optical modulator.

17. A chirped pulse amplification (CPA) fiber laser device, comprising:

a seed laser configured to produce input laser pulses at an initial repetition rate;

a pulse stretcher configured to stretch the input laser pulses to produce stretched laser pulses;

a pulse picker configured to modulate the stretched laser pulses to a modulated repetition rate in response to a repetition control signal;

a pulse rate controller configured to produce the repetition control signal to control the pulse picker to modulate the stretched laser pulses;

an optical power amplifier configured to amplify the stretched laser pulses to produce first amplified laser pulses;

a pulse linearity controller configured to control a first bias current in the optical power amplifier to vary pulse energies in the first amplified laser pulses in accordance to the modulated repetition rate; and a pulse compressor configured to compress widths of the first amplified laser pulses to produce output laser pulses at the modulated repetition rate.

18. The fiber laser device of claim 17, wherein the first pre-amplifier is controlled by the pulse linearity controller to vary widths of the second amplified laser pulses to minimize non-linear dispersions according to pulse energy levels.

19. The fiber laser device of claim 18, wherein the pulse linearity controller controls the first pre-amplifier to vary widths of the second amplified laser pulses according to the modulated repetition rate.

20. The fiber laser device of claim 17, further comprising:

a switchable dispersion compensator, wherein the pulse linearity controller is configured to control the switchable dispersion compensator to compensate for non-linear dispersion in the output laser pulses in accordance to the modulated repetition rate.

21. The fiber laser device of claim 20, wherein the switchable dispersion compensator comprises:
- a plurality of optical fiber paths in a parallel circuit, wherein each of the plurality of optical fiber paths is configured to produce an optical dispersion to compensate for a nonlinear optical dispersion in the output laser pulses at the specific modulated repetition rate; and
- an optical switch is configured to direct the stretched laser pulses to pass through one of the plurality of optical fiber paths under the control of the pulse linearity controller.

22. The fiber laser device of claim 17, wherein the pulse compressor is adjusted under the control of the pulse linearity controller to compensate for nonlinear dispersion in the output laser pulses in accordance to the modulated repetition rate.

* * * * *